United States Patent

[11] 3,629,566

| [72] | Inventor | David R. Brickner<br>Phoenix, Ariz. |
|---|---|---|
| [21] | Appl. No. | 880,037 |
| [22] | Filed | Nov. 26, 1969 |
| [45] | Patented | Dec. 21, 1971 |
| [73] | Assignee | Sperry Rand Corporation |

[54] ELECTRONIC MULTIPOINT COMPENSATOR
7 Claims, 5 Drawing Figs.

[52] U.S. Cl........................................... 235/183,
235/92 CC, 235/150.51, 235/152, 235/197,
328/129
[51] Int. Cl..................................................... G06g 7/30,
G06f 15/32
[50] Field of Search.........................................235/150.53,
152, 164, 183-197

[56] References Cited
UNITED STATES PATENTS

| 3,246,130 | 4/1966 | Rubin............................ | 235/152 |
| 3,247,365 | 4/1966 | Dell et al. ..................... | 235/164 |
| 3,412,240 | 11/1968 | Hunt et al. .................... | 235/164 |
| 3,431,501 | 3/1969 | David et al.................... | 235/183 |

OTHER REFERENCES

Skramstad: A combined Analog-Digital Differential Analyzer 1959 Proceedings of the Eastern Joint Computer Conference pages 94– 100.

*Primary Examiner*—Malcolm A. Morrison
*Assistant Examiner*—Felix D. Gruber
*Attorney*—S. C. Yeaton ABSTRACT: Signal-compensating apparatus comprising a storage device containing a plurality of deviation signals corresponding to predetermined values of a variable signal and two serially connected counters for providing a digital signal representative of the instantaneous value of the variable signal, the counters being operative in conjunction with a timing unit and switching array for successively selecting the deviation signals corresponding to values of the variable signal immediately disposed about the instantaneous value thereof for application to an integrator and simultaneously controlling the integration interval of each of the selected deviation signals whereby an interpolated signal corresponding to the instantaneous value of the variable signal is obtained.

INVENTOR
DAVID R. BRICKNER
BY
ATTORNEY 3,629,566

ELECTRONIC MULTIPOINT COMPENSATOR

BACKGROUND OF THE INVENTION

1. Field of the Invention

The present invention relates generally to signal compensating devices and more particularly to apparatus for providing compensation signals to a variable signal which is known to include fixed deviation errors at preselected values, the apparatus having the further capability of interpolating the error signal at values of the variable signal intermediate the preselected values.

Although apparatus constructed in accordance with the present invention has general utility both as an interpolating mechanism for any continuous function of a given variable and as a multipoint compensator for providing corrective signals to a variable signal known to include predetermined error components at prescribed values, it is particularly useful in aircraft compass systems and will therefore be described with reference to such an application.

2. Description of the Prior Art

In an aircraft compass system static deviation errors representative of the angular difference between actual magnetic heading and the compass indicated heading are caused by fixed errors in the compass equipment and local magnetic attractions such as permanently magnetized portions of the craft structure or electrical power and communications equipment carried on the craft in the vicinity of the compass equipment. The predominant deviation errors are typically cyclic in nature and change in amplitude at rates respectively equal to and double the aircraft heading rate. For any craft these errors generally remain fixed at given values for known heading angles. Thus, a deviation curve based on deviation measurements at a plurality of heading angles can be obtained to provide an indication of the heading error of the compass system. Then during the course of navigating the craft the deviation error curve can be referred to for the purpose of making necessary corrections for the error. This can be accomplished by either adjusting the heading of the craft or compensating the heading indication.

Compass systems are customarily compensated at intervals of 15° or 24 discrete points over the 360° heading spectrum. Heretofore such compensation has been implemented by means of electromechanical heading followup systems of the mechanical synchro type or the electrical null-shift type which are well known to those skilled in the art. These compass compensators require a shaft input for compensation selection, however, and therefore are not suitable for use in present state of the art electronic compass coupler systems.

SUMMARY OF THE INVENTION

The necessity for a shaft input is eliminated in the present invention by the provision of electronic apparatus comprising a storage unit identified hereinafter and in the drawings as a switch and compensation unit or array wherein the stored signals are represented by potentiometer settings indicative of a plurality of predetermined deviation signals, corresponding to prescribed values of a variable input signal, and two serially connected counters for respectively providing the least significant bits (LSB) and most significant bits (MSB) of a digital signal representative of the input. The most significant bits operate to actuate logic and switching circuits for successively selecting the deviation signals corresponding to the two values of the input signal disposed immediately about the instantaneous value thereof for application to an integrating device. The least significant bit counter operates in response to appropriately timed clock pulses to control the integration interval of the selected deviation signals such that the deviation signal corresponding to a value of the input signal immediately less than the instantaneous value is integrated for an interval equal to the time required to fill the least significant bit counter, which has a capacity equal to the separation between the preselected values of the input signal. As the least significant bit counter fills and recycles to zero, it provides an additional input pulse to the most significant bit counter which then activates the logic circuits so as to select the deviation signal corresponding to a value of the input signal immediately greater than the instantaneous value thereof. This deviation signal is then integrated for a time equal to the difference between a time interval proportional to the separation of the predetermined values and the time required to fill the least significant bit counter from the inception of the integration period or, stated differently, for a time required to restore the least significant bit counter to the count it had at the beginning of the integration period after recycling to zero.

BRIEF DESCRIPTION OF THE DRAWINGS

FIG. 1b is a timing diagram relating to the apparatus shown in FIG. 1a.

FIG. 1c is a functional plot of a variable signal used for explaining the operation of the apparatus of FIG. 1a.

DESCRIPTION OF THE PREFERRED EMBODIMENT

Figure 1A:
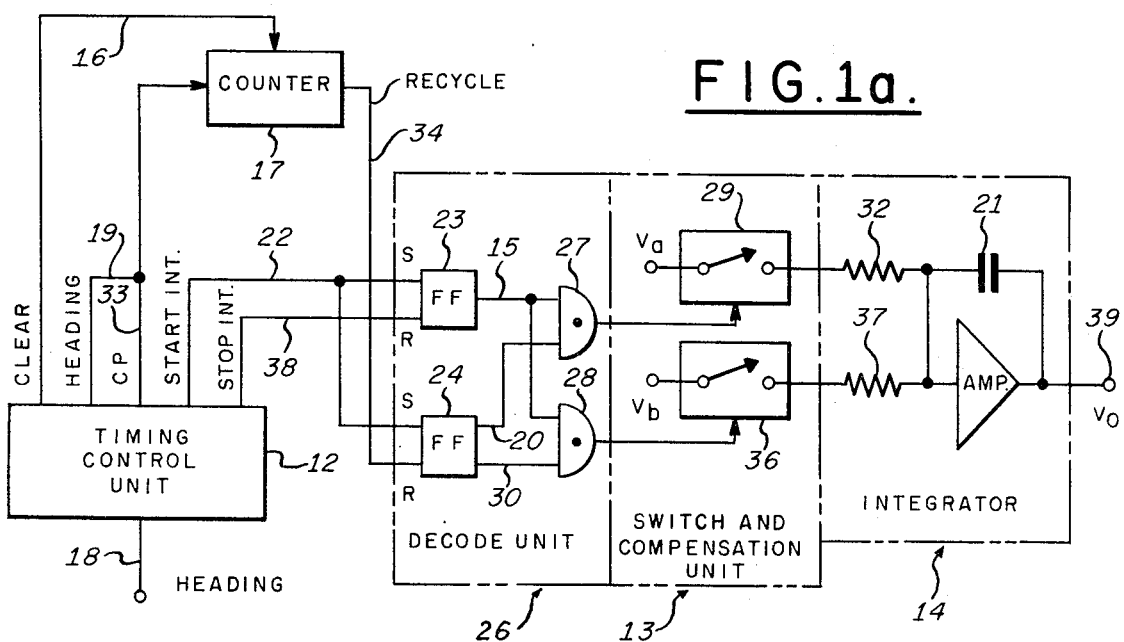
FIG. 1a is a block diagram of an interpolating apparatus constructed in accordance with the principles of the present invention.

Before proceeding to a description of a preferred embodiment of the invention, it will be instructive first to consider the theory and implementation of a simplified structure relating to the interpolation method of the invention. FIG. 1c depicts a variable signal represented by the curve 10 which is indicated as having ordinate values $Y_a$ and $Y_b$ relating respectively to abscissa values X and $X_b$, that is, $Y_a$ is a function of $X_a$ and $Y_b$ is a function of $X_b$. For the case of a signal having a constant slope in the range from $X_a$ to $X_b$ as indicated by line 11, the ordinate value Y at any point along the abscissa in the range can be determined simply by adding the value $Y_a$ to the product of the slope and the distance along the abscissa between $X_a$ and the point of interest. This can be expressed mathematically as $$Y = f(X) = \left(\frac{Y_b - Y_a}{X_b - X_a}\right)(X - X_a) + Y_a \quad (1)$$

This equation can also be used to provide linearized approximations for a signal having a variable slope in the range $X_a$ to $X_b$ as indicated by curve 10. It is apparent that these approximations will be quite accurate if the curve is devoid of discontinuities and the abscissa increments are made sufficiently small. It can be shown that the above equation can also be solved by means of appropriate integration techniques. For instance, equation (1) can be rewritten in the form $$Y = f(X) = (Y_b - Y_a)\left(\frac{X - X_a}{X_b - X_a}\right) + Y_a\left(\frac{X_b - X_a}{X_b - X_a}\right)$$

which is equivalent to $$Y \cdot (X_b - X_a) = (Y_b - Y_a)(x - X_a) + Y_a(X_b - X_a)$$

Or $$Y \cdot (X_b - X_a) = Y_b x - Y_b X_a + Y_a X_b - Y_a X$$

The right side of this equation is the solution to the bounded integral $$\int_{X_a}^{X} Y_b \, dx + \int_{X}^{X_b} Y_a \, dx \quad (2)$$

Thus, if the value of the abscissa increment $(X_b - X_a)$ is known, an approximation of the ordinate value Y, corresponding to any value of $X$ within that increment, can be determined by integrating the ordinate value $Y_b$ over the range from $X_a$ to $X$ and summing it with the integration of the ordinate value $Y_a$ over the range from $X$ to $X_b$. In other words an interpolation process can be realized by means of integrating apparatus implemented to perform the function of equation (2). This is accomplished by the apparatus of FIG. 1a which includes a timing control unit 12 for performing the procedure repetitively in order to obtain periodically updated measurements corresponding to the instantaneous magnitude of the variable input data.

The ordinate values $Y_a$ and $Y_b$, representing deviation errors at discrete heading angles in the compass compensator to be described subsequently, are provided by voltages $V_a$ and $V_b$ picked off respective potentiometers (not shown) in switch and compensation unit 13. The voltages are selected for application to integrator 14 in accordance with the following procedure. Timing control unit 12 first provides a clear signal on lead 16 during interval $T_1$ (FIG. 1b) to counter 17 to reset the counter to zero. During timing interval $T_2$ the input (heading) signal in the form of a pulse train of a variable number of pulses is connected to the timing control unit on lead 18 and coupled therethrough onto lead 19 connected to the counter input whereupon the logic state of the various stages in the counter become representative of the magnitude (heading angle) of the input signal. For simplicity of discussion at this point it is assumed that the minimum value of the input signal corresponding to point $X_a$ would produce a zero count in the counter while the maximum value of the input signal corresponding to point $X_b$ would exactly fill the counter. Accordingly, interval $T_2$ is set to equal the time required to couple the maximum value of the input signal into counter 17, that is, the interval corresponding to the separation between $X_a$ and $X_b$ is equal to the time required to fill the counter. During this time interval the integrator 14 is also reset to zero in preparation for the next integration cycle. This is typically accomplished by momentarily closing a switch (not shown) connected across feedback capacitor 21 as will be explained hereinafter with reference to FIG. 2.

After the input signal has been read into the counter and the integrator cleared, the integration process commences at the start of time interval $T_3$ in response to a signal provided from the timing control unit on lead 22 to the set terminal (S) of bistable flip-flops 23 and 24 in decode unit 26 whereupon a signal is furnished from the output terminal 15 of flip-flop 23 to AND-circuits 27 and 28. AND-circuit 27 also receives an input signal from output terminal 20 of flip-flop 24 thereby enabling the AND circuit to actuate switch 29 in switch and compensation unit 13 and couple voltage $V_a$ therefrom to input resistor 32 of integrator 14. Also, upon commencement of interval $T_3$ clock pulses are applied on lead 33 from timing control unit 12 to the input of counter 17. These clock pulses have a repetition rate commensurate with the storage capacity of the counter and the time interval corresponding to the separation between points $X_a$ and $X_b$.

It will be recalled that during interval $T_2$ the counter stored a count representative of the instantaneous value of the input signal applied thereto. As a result, if the input signal had a value half way between $X_a$ and $X_b$ the counter would be half filled. Similarly, if the instantaneous value of the input signal had a value equal to three quarters of the increment from $X_a$ to $X_b$ the counter would be three quarters filled. It will be appreciated therefore that the spacing between the instantaneous value of the input signal and the value thereof corresponding to discrete point $X_b$ is represented by the time required to fill the counter and cause it to recycle to zero. Thus, during one part of interval $T_3$ the value $Y_a$, represented by voltage $V_a$, is selected for integration in the interval or over the range from $X$ to $X_b$ whereby the second term of the bounded integral (2) is provided.

At the moment the counter recycles to zero a signal is provided therefrom on lead 34 to the reset terminal (R) of flip-flop 24. This reverses the polarity of the signal on the flip-flop output terminal 20 causing AND-circuit 27 to cease conducting, thereby opening switch 29 and disconnecting voltage $V_a$ from the integrator input. At the same time a signal is coupled from output terminal 30 of flip-flop 24 to AND-circuit 28 where it cooperates with the signal applied thereto from flip-flop 23 to activate the AND circuit which in turn activates switch 36 causing voltage $V_b$ (corresponding to the deviation error $Y_b$ at input signal magnitude $X_b$) to be applied from the switch and compensation unit to input resistor 37 of integrator 14. Voltage $V_b$ is then integrated for a time (the remaining part of interval $T_3$) equal to the separation between point $X_a$ and the point $X$ corresponding to the instantaneous value of the input signal, thereby providing the first term of the bounded integral (2). During this time, clock pulses continue feeding into the counter on lead 33 so that at the end of the integration period the counter is set to the value it had prior to integration. Termination of the integration period is signified by an abrupt cessation of the clock pulses feeding to the counter and the appearance of a signal on lead 38 coupled between the timing control unit and the reset terminal (R) of the flip-flop 23 which reverses the polarity of the signal at the flip-flop output terminal 15 causing AND-circuit 28 to cease conducting and thereby open switch 36 to remove voltage $V_b$ from the integrator input. The voltage $V_o$ produced at the integrator output terminal 39 at the conclusion of interval $T_3$ is therefore equal to the sum of the integrated signals.

The duration of the integration period can be ascertained by any conventional timing technique inasmuch as the spacing between points $X_a$ and $X_b$ is known. A somewhat elaborate but highly accurate determination can be made for instance by storing the count at the beginning of the integration period in a shift register and then comparing the continuously varying count in the counter with the information stored in the register for the purpose of stopping the integration process when the data in the counter and register become equal to one another.

In order to utilize apparatus of the aforedescribed nature in a system where a plurality of increments exist, that is, one in which there are a plurality of known points, $X_1$ $X_2$ $X_3$ ...$X_n$, some means must be provided to determine the particular increment in which the input signal is located. This capability is achieved in the preferred embodiment of the invention depicted in FIG. 2 by the provision of a counter mechanism including two serially connected counters 41 and 42. Counter 42 is a conventional five-stage counter internally connected so as to provide 24 discrete outputs and recycle once for every 24 pulses applied to its input. Counter 41 is also a conventional five-stage counter but is arranged to recycle for every 32 pulses applied to its input. In operation of this device, after the counters have been cleared during timing interval $T_1$ in response to a signal applied from the timing control unit 40 as described with reference to FIG. 1a, the heading signal on lead 60 is applied through the timing control unit to the input terminal 43 of counter 41. A 360° heading signal is represented by 768 pulses corresponding to the total storage capacity of both counters, that is, 32×24=768. For every 32 pulses applied to counter 41, one pulse is applied therefrom on lead 44 to the input of counter 42, whereby the former contains the least significant bits and the latter the most significant bits of the heading signal.

Counter 42 therefore becomes filled after counter 41 recycles 23 times and the next time counter 41 recycles both counters reset to zero. Hence, the 24 logic combinations provided by counter 42 represent 24 discrete heading angles from zero to 360° uniformly spaced in 15° increments. For a heading angle exactly equal to one of the predetermined error measuring points, for example, 0°, 15°, 30°, etc., counter 41 will be set at zero and the angle will be represented solely by counter 42. For a heading angle intermediate any of these measuring points counter 41 will contain a count proportional to the angular displacement from the next lowest point represented by counter 42.

It will be apparent to those skilled in the art that heading information is typically provided in analog form, represented for example by a shaft angle. In accordance with the time integral procedures used in the embodiments described herein it is therefore necessary that the analog signal first be converted to an equivalent time duration signal. Apparatus for converting such analog signals to an equivalent time duration signal preparatory to conversion to a digital pulse train is described in notes on Analog-Digital Conversion Techniques, pages 5–2 and 5–3, edited by A. K. Suskind and published by The Technology Press, Massachusetts Institute of Technology, 1957.

The logic outputs from counter 42 are in the conventional five-stage format 00000, 00001, 00010, 00011, etc. with 24 unique combinations being provided from the total of 32 possible combinations. These logic signals are coupled from counter 42 to decode array 46 by way of leads 47. In this instance the decode array comprises a plurality of standard logic circuits responsive to the respective logic signals for actuating related switches in switch and compensation array 48 by way of signals applied thereto on leads 49. The switch and compensation array in turn operates to select appropriate potentiometers therein for connection on lead 50 to the input resistor 51 of integrator 52. The preferred potentiometer switch configuration will be described subsequently with reference to FIG. 3.

Figure 2:
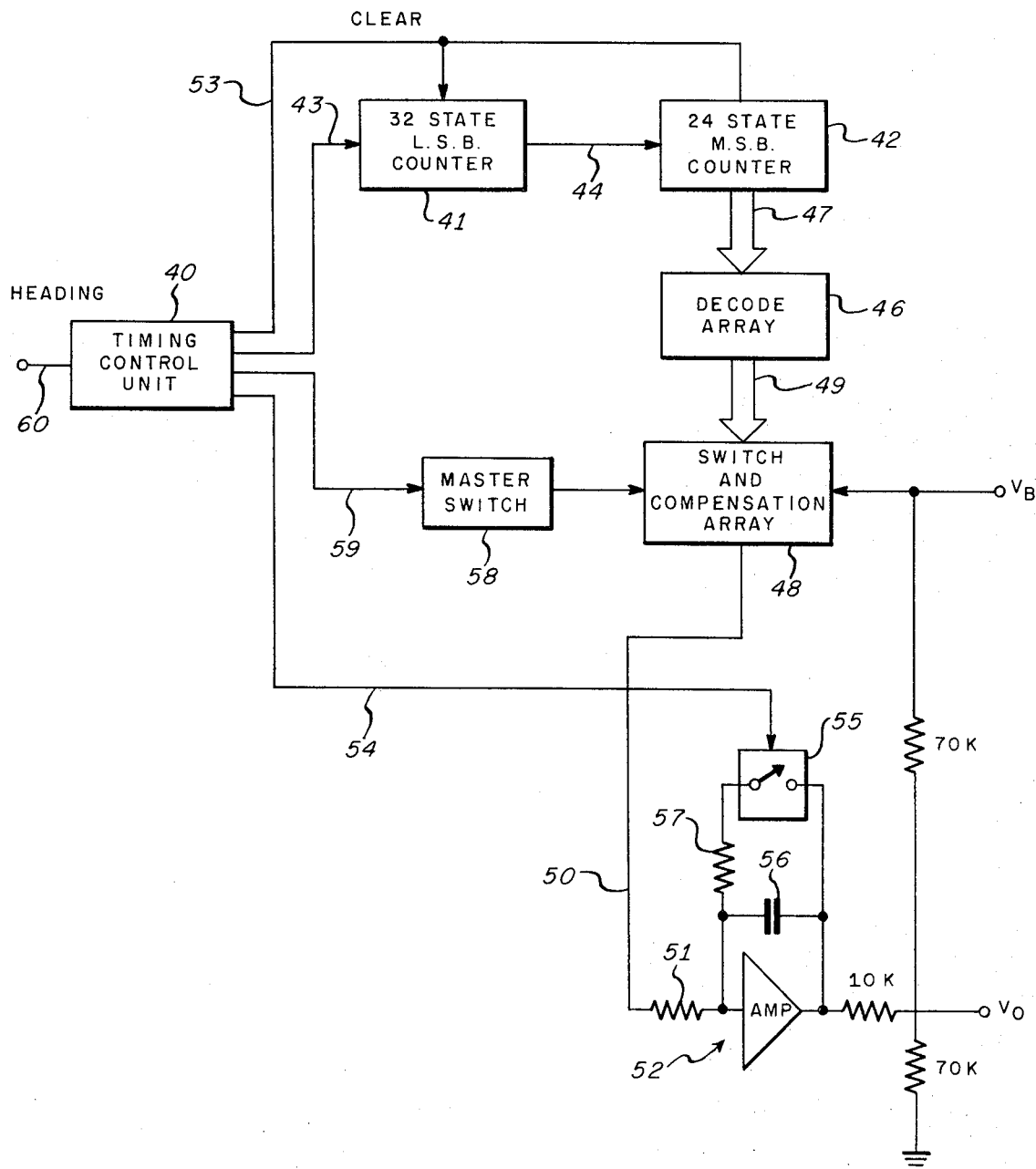
FIG. 2 is a block diagram of a preferred embodiment of a signal compensating and interpolating apparatus constructed according to the present invention.

The operation of the apparatus of FIG. 2 is identical to that of FIG. 1a except that the logic output provided by the most significant bit counter alone is used to select the two points between which the instantaneous value of the heading signal lies, the predetermined deviation signal corresponding to the heading value immediately less than the instantaneous heading value being selected from the switch and compensation array for application to the integrator during the first part of the integration period exactly as in the case of the FIG. 1a apparatus. Thus, in the course of performing the integration, the deviation signal corresponding to the heading value less than the instantaneous heading value is integrated until the least significant bit counter recycles to zero in response to clock pulses applied thereto from the timing control unit. At the moment the least significant bit counter recycles to zero an additional pulse is applied on lead 44 to the input of most significant bit counter 42 causing it to produce a different logic output signal so that the switch and compensation array then provides to the integrator input a deviation signal corresponding to the predetermined heading angle immediately greater than the instantaneous heading. It is therefore seen that the selection of two successive deviation signals for application to the integrator is made by the switch and compensation array acting in response to the decode array which in turn is responsive to the logic output of counter 42 as determined by the number of clock pulses applied to counter 41. The range or length of time for which each selected deviation signal is integrated is controlled in accordance with the initial count in counter 41 and the time required for that counter to reach a full count and then recycle through zero and return to the initial count provided by the heading input pulse train gated through the timing control unit during the preceding time interval $T_2$. More specifically, one deviation signal is integrated for an interval equal to the length of time for counter 41 to change from the initial heading signal count to a full count while the other deviation signal is integrated for an interval equal to the time required for counter 41 to count from zero back up to the initial count. Accordingly, control of the integration ranges is determined by the counters 41 and 42 actuating the decode array 46 in response to the clock pulses provided from timing control unit 40.

Figure 1B:
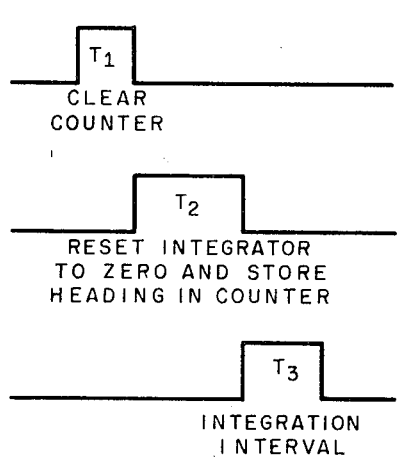
Figure 1C:
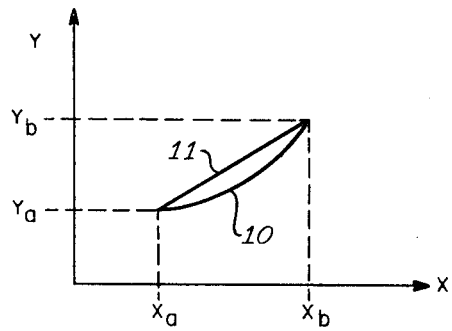

Other aspects of the operation relating to timing and clearing of the integrator and counters are also similar to the apparatus of FIG. 1a and related timing diagram of FIG. 1b. During timing interval $T_1$ a clear signal is sent from timing control unit 40 on lead 53 to counters 41 and 42 resetting them to zero. During timing interval $T_2$ integrator 52 is reset to zero by a signal applied from the timing unit on lead 54 to close clear switch 55 connected across the integrator feedback capacitor 56. Resistor 57 precludes a direct short from being established across the integrator input and output terminals when clear switch 55 is closed. Also, in interval $T_2$ the instantaneous value of the heading signal is read into the counters. Finally during interval $T_3$ the integration process is performed when Master switch 58 is closed by a signal applied thereto on lead 59 from the timing unit. At the end of the interval $T_3$ the signal is removed from lead 59 and master switch 58 is opened so no further compensation signals are applied to the integrators.

Figure 3:
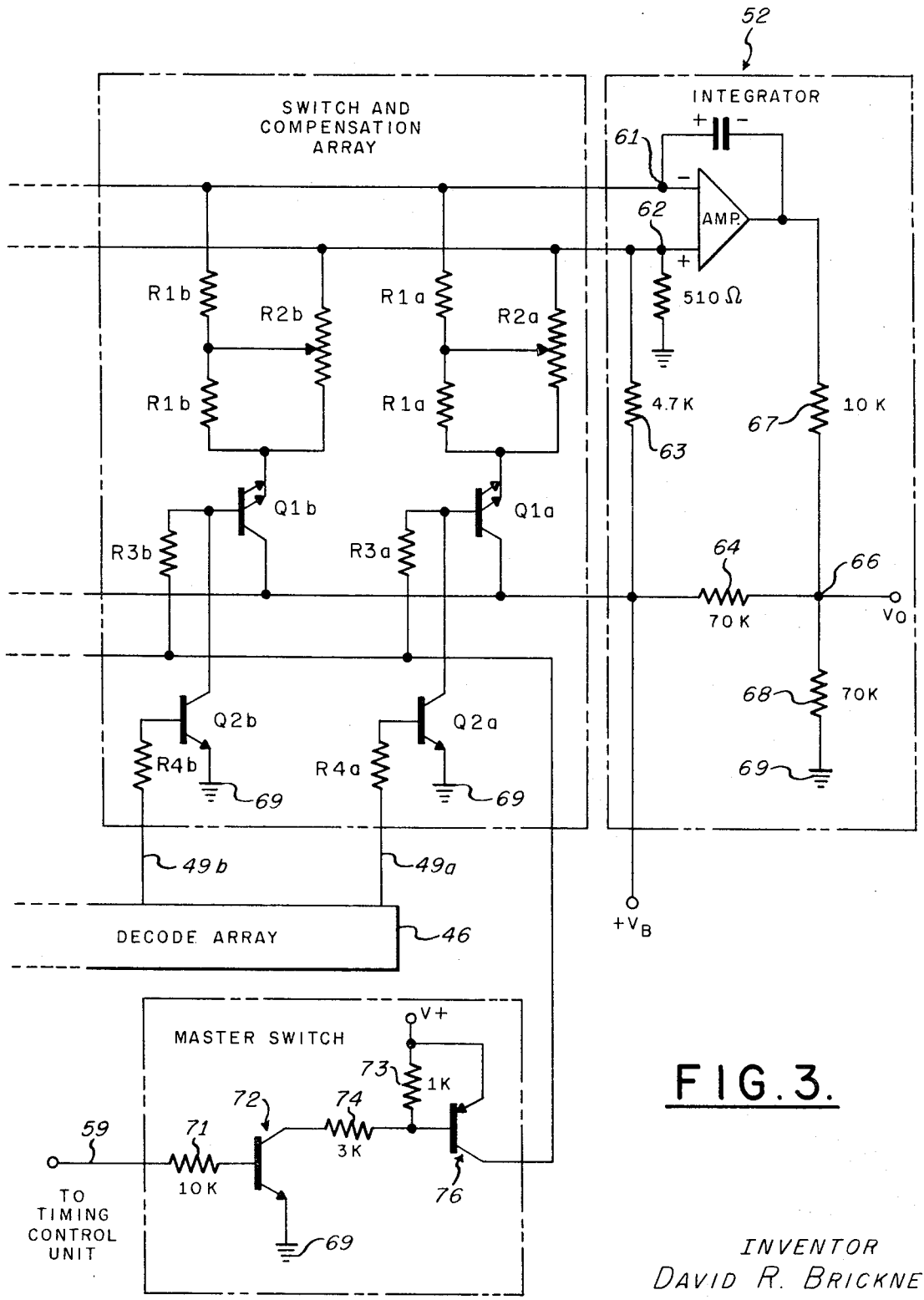
FIG. 3 is a schematic presentation of a portion of the switch and compensation array of FIG. 2.

FIG. 3 depicts two of the 24 switch and potentiometer combinations incorporated in switch and compensation array 48 showing their relationship to the decode array 46, integrator 52 and master switch 58. Potentiometer R2a, R2b, etc., are set in accordance with the deviation errors measured at the 24 discrete values of the variable input signal. The resistor networks R1a, R1b and the associated identically lettered potentiometers are individually switched into the input of integrator 52 upon closure of the related transistor switches Q1a, Q1b. These transistors are normally open as a consequence of transistors Q2a, Q2b being in a saturated conduction state by virtue of the high potential applied to their bases from decode array 46 on leads 49a, 49b connected to resistors R4a, R4b respectively. During the open condition of transistors Q1a, Q1b (time intervals $T_1$ and $T_2$) the resistor networks are simply connected across the input terminals of the integrator and the integrator output therefore stabilizes at a positive value as determined by the voltage source $+V_B$ connected through the 4.7 K resistor 63 to the inverting input terminal 62 of the integrator and through the 70 K resistor 64 to output terminal 66. As further indicated in the drawing, the integrator is connected through 10 K resistor 67 to output terminal 66 which in turn is connected through 70 K resistor 68 to ground 69. This arrangement provides bias for the integrator such that the output voltage $V_o$ varies about zero. It should be understood that the resistor values are indicated merely to provide the reader with an idea of the voltage levels produced by the various conductive paths existing between output terminal 66 and voltage source $+V_B$, since other values and different ratios of such values may be used if desired.

At the inception of timing interval $T_3$ the timing control unit 40 provides a positive signal on lead 59 through 10 K resistor 71 to the base of transistor switch 72 causing it to close and thereby providing a conduction path from voltage source V+ through 1 K resistor 73, 3 K resistor 74 and the closed circuit of transistor 72 into ground 69 whereupon transistor 76 conducts and thereby couples source V+ through resistors R3a, R3b to the bases of transistors Q1a, Q1b respectively. Thus, at the start of interval $T_3$ the one lead of the plurality of leads $49_a$, $49_b$ which has the normally positive signal appearing thereon removed from it, as determined by the logic states of the stages in most significant bit counter 42 (FIG. 2), causes the corresponding transistor switch Q2a or Q2b, etc., to open whereupon the related transistor Q1a or Q1b closes and thereby couples voltage source $+V_B$ through the corresponding resistor and potentiometer network (R1, R2) to the input of the integrator. Under this condition current flows to both the inverting and noninverting input terminals of the integrator with the potentiometer settings controlling the difference in current levels between the terminals. Integration then proceeds as previously explained with reference to FIG. 2 with a different transistor switch Q1 closing at some time during the integration interval upon the occurrence of a change in the logic states of counter 42 so as to introduce a deviation signal corresponding to another discrete value of the variable input signal. At the conclusion of interval $T_3$ the positive signal is removed from lead 59 connected to the input of the master switch which in turn removes the excitation from source V+ to the base resistors R3a, R3b of transistor switches Q1a, Q2b. At this time the cycle is repeated with the commencement of time interval $T_1$.

While the invention has been described in its preferred embodiments, it is to be understood that the words which have been used are words of description rather than limitation and

I claim:
1. Signal interpolating apparatus comprising
    input means for receiving a variable input signal,
    means for storing a plurality of signals corresponding to a like plurality of discrete values of the variable input signal,
    integrating means for successively integrating two stored signals of said plurality of stored signals over prescribed integration ranges to provide an output signal equal to the integral of said two stored signals, and
    selecting means responsive to said variable input signal operative to apply to said integrating means the two stored signals corresponding to the two discrete values of said plurality of discrete valves between which the instantaneous value of the variable input signal is located,
    said selecting means including means for controlling the integration ranges of the successively selected signals such that the stored signal corresponding to one of the two discrete values is selected for integration over a range extending from the other of the two discrete values to the instantaneous value of the variable input signal and the stored signal corresponding to said other of the two discrete values is selected for integration over a range extending from the instantaneous value of the variable input signal to said one of the two discrete values.

2. The apparatus of claim 1 wherein said means for controlling the integration ranges comprises
    a first multistage counter,
    a second multistage counter serially connected to the output of said first counter whereby, in response to pulses applied to the input of said first counter, the logic states of the stages of said second counter change upon each occurrence of a full count in said first counter, and
    a timing unit for providing clock pulses to the input of said first counter,
    said first and second counters being operative initially to store the instantaneous value of said variable input signal whereupon the logic states of the stages of said second counter activate said selecting means to select one of said two stored signals and thereafter operative in response to said clock pulses for selecting the other of said two stored signals at the instant said first counter recycles to zero and transmits a signal to the input of said second counter to change the logic states thereof.

3. The apparatus of claim 2 wherein the selecting means includes a plurality of switches,
    each switch being coupled to a discrete storage device of said storing means and said plurality of switches being normally open except for one of said plurality of switches which is closed at a given instant in accordance with the logic states of said second counter so as to connect to the input of said integrating means the storage device to which said one switch is coupled.

4. The apparatus of claim 2 further including timing control means for applying a clear signal to said first and second counters during a first time interval to reset the counters to zero, applying said variable input signal to the input terminal of said first counter during a second time interval, and applying clock pulses to the input terminal of said first counter during a third time interval.

5. The apparatus of claim 4 further including additional switching means connected to said integrating means for operating during a time interval other than said third interval in response to a signal from said timing control means for resetting said integrating means at a stabilized output voltage level.

6. The apparatus of claim 5 wherein the storage means includes a plurality of switches,
    each switch being coupled to a discrete storage device of said storing means and said plurality of switches being normally open except for one of said plurality of switches which is closed at a given instant in accordance with the logic states of said second counter so as to connect to the input of said integrating means the storage device to which said once switch is coupled.

7. A multipoint electronic signal compensating apparatus comprising
    input means for receiving a variable input signal,
    means for storing a plurality of signals representative of functions of the variable input signal at a plurality of discrete values thereof,
    a first counter,
    a second counter having its input connected to the output of said first counter,
    timing means for successively clearing said counters during a first time interval, gating said variable input signal to the input of said first counter during a second time interval, and applying clock pulses to the input of said first counter during a third time interval,
    a logic network including a plurality of logic circuits each of which is responsive to a discrete logic output of said second counter,
    a switching network including a plurality of switching means each of which is responsive to a signal from a corresponding logic circuit for applying one of said plurality of stored signals to the input of an integrating means during one part of said third time interval and applying another of said plurality of stored signals to the input of an integrating means during another part of said third time interval, and
    integrating means for successively integrating said one and said another of said stored signals whereby said integration output is an interpolated value of said stored signal.

* * * * *